United States Patent [19]

Schultz

[11] Patent Number: 4,859,420

[45] Date of Patent: Aug. 22, 1989

[54] HEATING SYSTEM FOR ROTATING MEMBERS

[75] Inventor: Steven G. Schultz, Winthrop Harbor, Ill.

[73] Assignee: Abbott Laboratories, North Chicago, Ill.

[21] Appl. No.: 858,330

[22] Filed: May 1, 1986

Related U.S. Application Data

[62] Division of Ser. No. 606,787, May 3, 1984, Pat. No. 4,632,908.

[51] Int. Cl.[4] ...................... G01N 31/22; G01N 25/04

[52] U.S. Cl. ...................................... 422/58; 116/217; 250/429; 350/331 T; 350/351; 374/141; 374/150; 374/159; 374/162; 422/64; 422/72; 422/102; 436/45; 436/55

[58] Field of Search ..................... 422/58, 102, 64, 72; 430/45, 55; 116/217; 350/331 T, 351; 250/429; 374/141, 150, 159, 162

[56] References Cited

U.S. PATENT DOCUMENTS

| | | | |
|---|---|---|---|
| 3,869,215 | 3/1975 | Nolan | 356/246 |
| 4,161,557 | 7/1979 | Suzuki et al. | 428/1 |
| 4,180,722 | 12/1979 | Clewans | 250/331 |
| 4,360,360 | 11/1982 | Chiknas | 422/72 |
| 4,456,581 | 6/1984 | Edelmann et al. | 422/102 |
| 4,531,061 | 7/1985 | Rabinow | 250/223 R |

*Primary Examiner*—Barry S. Richman
*Assistant Examiner*—Jill Johnston
*Attorney, Agent, or Firm*—Thomas D. Brainard; Donald L. Corneglio; Edward H. Gorman, Jr.

[57] ABSTRACT

A heating system for heating a rapidly rotating article, including a strobe capable of emitting radiant energy and positioned to radiate energy onto the article, a light source positioned to illuminate a temperature-sensing means on the article, a light detector to measure changes in the light reflected by the temperature-sensor and a control device to energize the strobe in response to reflected light from the detector.

3 Claims, 3 Drawing Sheets

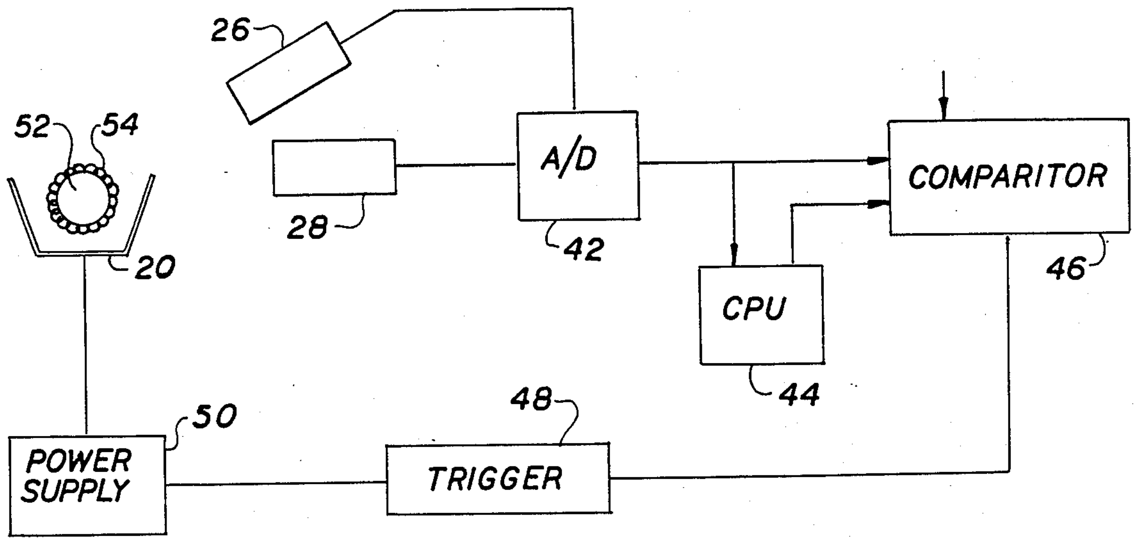
FIG. 6
FIG. 5
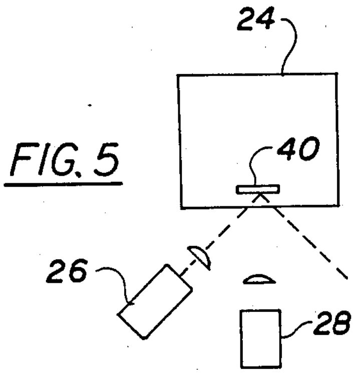
FIG. 7
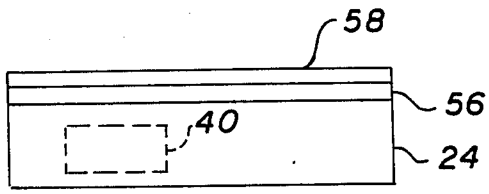

HEATING SYSTEM FOR ROTATING MEMBERS

This is a division of application Ser. No. 606,787, filed May 3, 1984, now U.S. Pat. No. 4,632,908.

This invention relates to a heating system, and more specifically to a method and apparatus for radiation heating of a rapidly rotating substrate.

In copending applications Ser. Nos. 606,786 and 606,785, filed concurrently herewith, the disclosures of which are incorporated herein by reference, there is described a method and apparatus for carrying out chemical testing in which an entire chemical test is effected on a rotating centrifuge. The centrifuge as disclosed in those copending applications is provided with a rotating plate on which there is mounted one or more sample processor card holders which rotate with the plate for generating centrifugal forces. The sample processor card holder mounted in such holders on the plate is rotatable relative to the plate to enable the direction in which the centrifuge force thus generated acts on a sample processor card positioned in the holder.

The sample processor card, in accordance with the preferred embodiments as described in those copending applications, is an essentially closed container which is provided with a reagent used in the particular chemical test to be carried out and means for supplying a sample to the card. Thus, in use, the sample is inserted into the card and the card positioned in the holder on the centrifuge. Centrifugal force is thus used to release the reagent from its container in the card and displaces both the reagent and sample through the card for reaction as part of the chemical test as well as, in the preferred embodiments, to effect liquid-solid separation by centrifugation before the sample is contacted with the reagent.

The product of the reaction is finally displaced to a cuvette chamber wherein the chemical reaction is determined, usually by optical means, to ascertain the results of the chemical test.

As is described in the foregoing applications, the method and apparatus there disclosed is particularly well suited for use in the determination of blood chemistries. Because, however, the temperature at which the reaction between the sample and reagent is carried out should be controlled to achieve accurate results, it is necessary, in most cases, to heat the reagent and/or sample to insure that they are within a relatively narrow temperature range. That heating operation is complex by reason of the fact that the centrifuge plate typically makes one revolution every 30 milliseconds, and thus supplying heating to the rapidly rotating card represents a difficult task. In addition, the centrifuge plate frequently carries a number of different cards at the same time, each of which must be selectively heated from differing starting temperatures. It is not uncommon for the centrifuge plate to carry a number of cards, each of which is at a different temperature and all of which must be brought to the optimum temperature within a short period of time, typically one to two minutes.

It is accordingly an object of the present invention to provide a method and apparatus for heating a rapidly rotating element.

It is a more specific object of the invention to provide a method and apparatus for selectively heating each of a number of rotating elements carried on a centrifuge plate without contact between the heating device and the rotating element.

It is yet another object of the present invention to provide method and apparatus for selectively heating a rotating chemical reaction vessel to control the temperature of the contents thereof.

These and other objects and advantages of the invention will appear more fully hereinafter, and, for purposes of illustration but not of limitation, an embodiment of the invention is shown in the accompanying drawings where:

FIG. 5 is a schematic illustration of the light source and detector arrangement employed in the practice of this invention;

FIG. 6 is a schematic view of the control system employed in the heating system of the invention.

FIG. 7 is a side view in elevation of a preferred sample processor card used in the practice of the invention.

The concepts of the invention reside in a method and apparatus for heating a rapidly rotating article which includes a strobe light capable of emitting radiant energy which is positioned to radiate energy onto the article to be heated. Positioned on that article is a temperature sensing means rotating therewith, the temperature sensing means being adapted to reflect radiant energy as a function of its temperature. A light source is positioned to illuminate the temperature sensing means during rotation of the article and the light detector measures the changes in the light reflected by the temperature sensing means. If the temperature of the temperature sensing means is too low, a control circuit operatively connected to the detector causes the strobe light to be energized in synchronism with the rotation of the article to illuminate the article periodically, for example, during periodic rotations until the article is heated to the desired temperature.

It has been found, in accordance with the practice of the invention, that the article can be heated effectively, and that a number of articles rotating together can be individually and selectively heated.

The concepts of the present invention are particularly well suited in the heating of chemical reagents present in sample processor cards used in accordance with the foregoing copending applications. For example, the strobe can be pulsed for no longer than about 2 milliseconds during each revolution of the card with the plate. Since the temperature sensing means is associated with each card, each card can be selectively heated to bring it to the desired temperature, independent of the temperatures of the other card.

Figure 1:
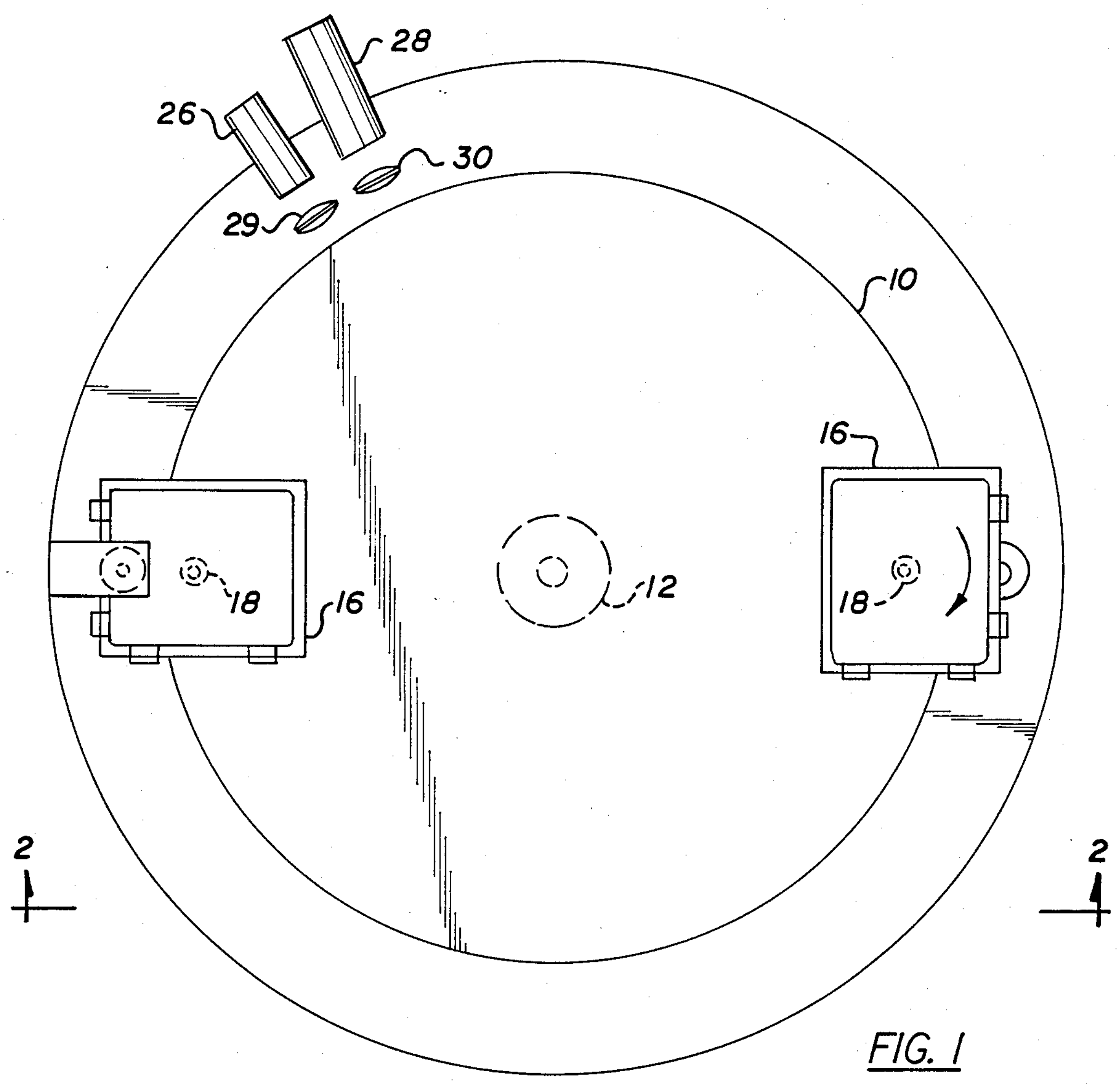
FIG. 1 is a schematic top view of a centrifuge equipped with the heating system of the present invention.
Figure 2:
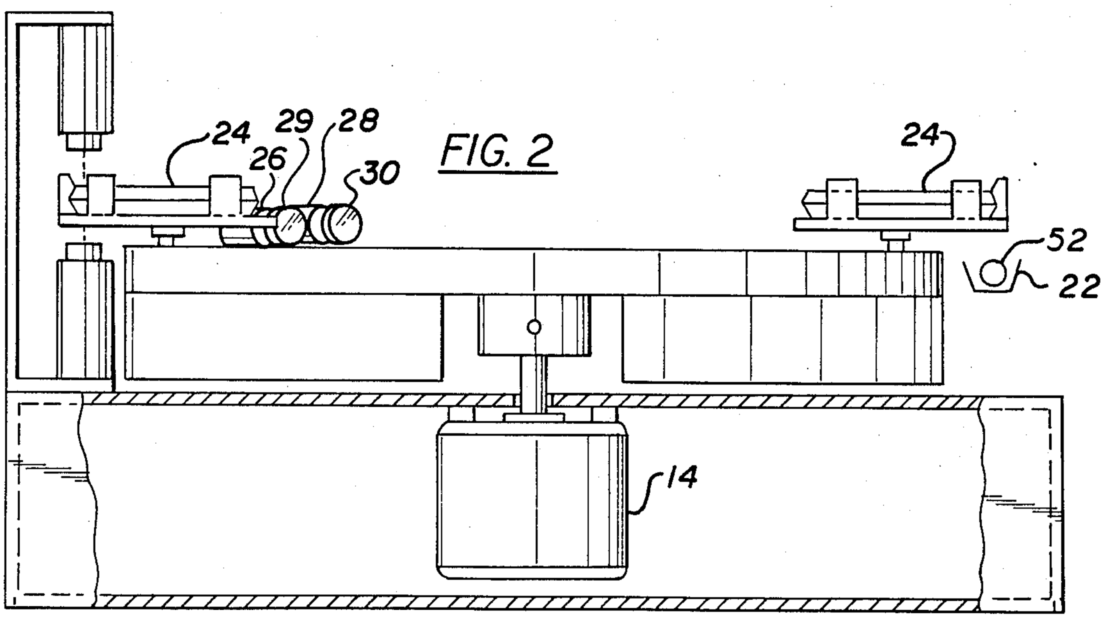
FIG. 2 is a sectional view taken along the lines 2—2 in FIG. 1.

Referring now to the drawings for a more detailed description of the invention, there is shown in FIGS. 1 and 2 a centrifuge equipped with the heating system of the present invention. The centrifuge includes a plate member 10 which is mounted for rotation on an axis 12, and is driven by suitable drive means 14, preferably an electrical motor capable of operating at high speeds. Mounted on the plate member 10 is at least one sample processor card holder 16 as described in copending application Ser. No. 606,785. The card holder 16 is akin to a tray and is rotatably mounted relative to the plate member 10 about an axis 18. The holder 16 can thus be rotated or indexed relative to the plate member 10 by suitable drive means not shown in the drawing for ease of description. The important feature is that the card holder 16 be adapted to receive the sample processor card and be rotatable relative to the plate member 10 so that the direction of centrifugal force acting on the sample processor card can be altered to effect the necessary fluid transport functions during the chemical testing operation.

The centrifuge is also provided with a strobe light 20 surrounded by a reflector 22 as shown most clearly in FIG. 2 of the drawings. The strobe 20 can be positioned beneath the holder 16 to illuminate the lower portion of a sample processor card 24 as shown in FIG. 2 of the drawings.

Mounted adjacent to the rotatable plate 10 is a light source 26 which is positioned to emit light through a lens 29 onto a portion of the sample procesosr card 24 during its rotation with the plate member 10 about the axis 12. Positioned adjacent to the light source 26 is a light detector 28 which is positioned to receive light reflected from a portion of the sample processor card 24 through a lens 30, as will be described more fully hereinafter.

Figure 3:
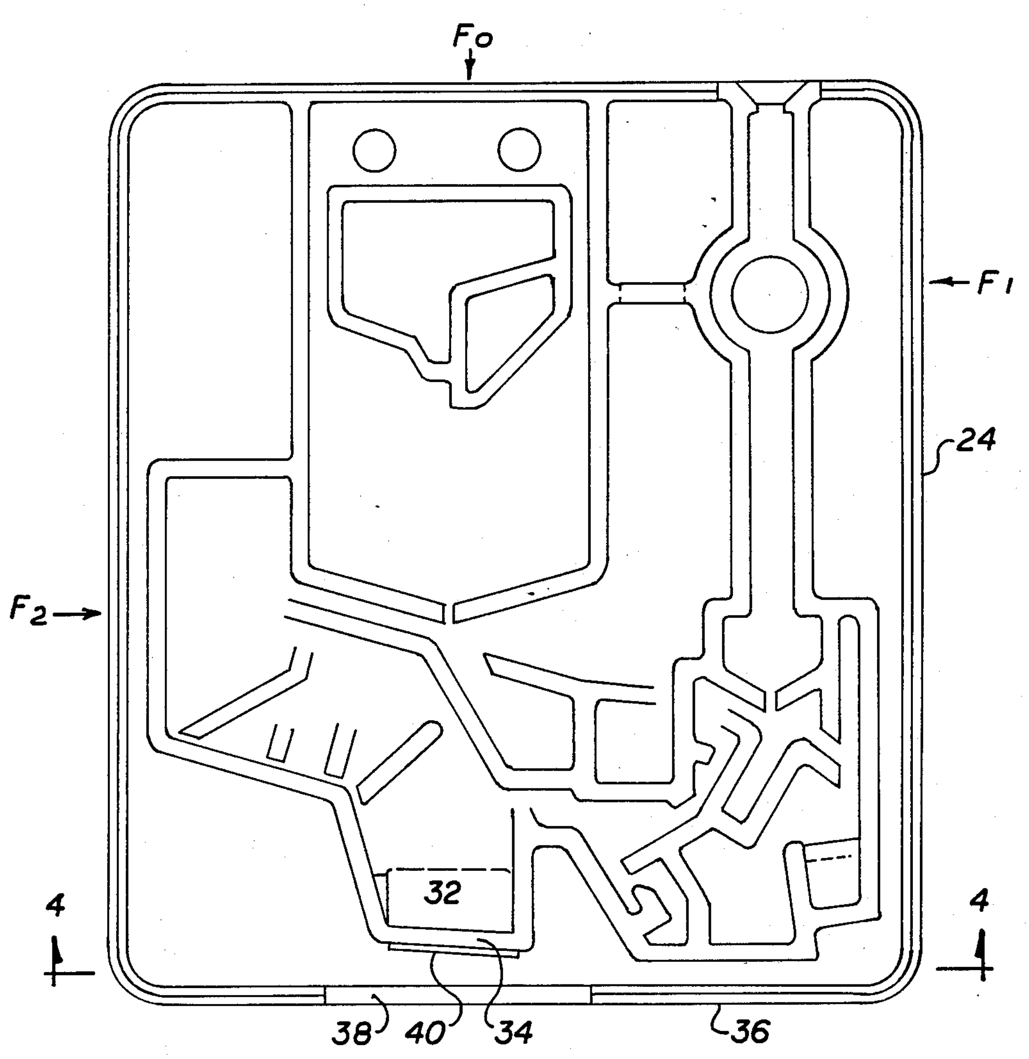
FIG. 3 is a plan view illustrating a sample processor card employed in the practice of this invention.
Figure 4:
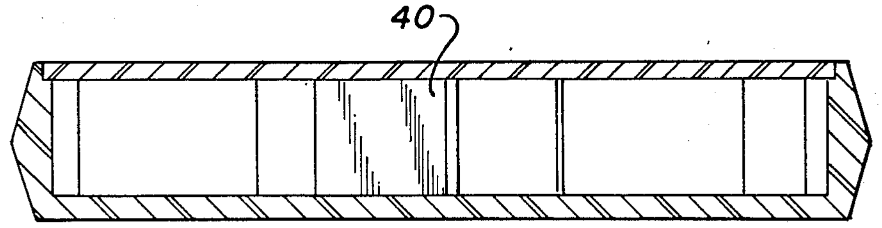
FIG. 4 is a sectional view taken along the lines 4—4 in FIG. 3.

A typical sample processor card used in the practice of this invention is described in detail in copending application Ser. No. 882,734, filed July 7, 1986, now abandoned and is also illustrated in FIGS. 3 and 4 of the drawings. The sample processor card includes means to introduce a sample to be analyzed, a supply of reagent and an overflow chamber to receive overflow sample inserted into the card. Sample is thus introduced into the card and moved through the various chambers defined therein by centrifugal force so that excess quantities of the sample introduced to the card flow into the overflow chamber. The sample and reagent are then mixed each with the other by centrifugal force acting in either the direction $F_0$ or $F_1$, until the reaction product formed by the reagent and sample is moved to a cuvette or measuring chamber so that the necessary measurement on the reaction product can be carried out, usually by optical means. The cuvette chamber 32, which is more fully described in the foregoing copending application, is a chamber in which the optical characteristics of the reaction product between the reagent and the sample are measured by suitable optical techniques well known to those skilled in the art. The cuvette chamber has a lateral wall 34 onto which there is fixed a temperature sensing device 40. Because of the proximity between the temperature sensing device 40 and the contents of the cuvette chamber 32, the temperature sensing device is essentially maintained at the temperature existing in the cuvette chamber 32. Since the exterior wall 34 is interior to the exterior wall 36, in the preferred embodiment of the invention of the card 24, there is provided a window 38 providing access to the temperature sensing device 40. Thus, the temperature sensing device 40 can be viewed through the window 38, as will be more fully described hereinafter.

In the preferred embodiment of the invention, the sample processor card 24 is placed in the sample holder 16 so that the window 38 extends opposite to the axis of rotation 12 of the plate member 10. After the manipulative steps, which are more fully described in the foregoing copending applications, have been carried out, and the reaction product of the sample and reagent are in the area of the cuvette chamber 32, the temperature sensing means 40 has a temperature substantially the same as the contents of the cuvette chamber 32. The light source 26 illustrated in FIG. 1 is positioned to illuminate the temperature sensing means 40 during each rotation of the sample processor card. During that rotation, it emits a light pulse through lens 29 as the temperature sensing means 40 passes by. The temperature sensing means 40 is preferably a light sensing element, usually in the form of liquid crystal, whose light reflectivity changes as the function of temperature. Thus, the light detector 28 measures through lens 30 the intensity of the light reflected by the temperature sensing element 40 as a measure of the temperature of the contents of the curvette chamber 32.

The details of the positional relationship between the light source 26 and the detector 28 relative to the temperature sensing element 40 carried by card 24 are shown in greater detail in FIG. 5 of the drawings. In the preferred embodiment as shown in FIG. 5, the light source 26 is positioned at an angle with respect to the temperature sensing means 40 so that direct reflected light leaving the temperature sensing element 40 follows a path away from the light detector 28.. The light detector 28 as shown in FIG. 5 can be positioned out of the reflected light path so that it measures the change in reflectivity of the temperature sensing element 40, rather than the light directly reflected by it.

In the preferred practice of the invention, the light source 26 is a light emitting diode or LED. Such LED's are preferred by reason of their long life, the fact that they emit a light source which is fairly monochromatic and the fact that they are a cool source of light imparting no substantial heat to the temperature sensing element 40. In addition, such LED's can be pulsed for extremely short periods, for example, of the order of 300 microseconds and yet provide a fairly intense source of light. In fact, in the one preferred embodiment of the invention, it has been found that infrared LED's provide the best results, being brighter. As an alternative, use can also be made of a LED capable of emitting visible light. Also, some detectors are more sensitive in the infrared region of the spectrum. The detector itself can be any of a variety of commercially available light detectors, the details of which form no part of the present invention.

The control system is described in greater detail in FIG. 6 of the drawing. As there described, the light source 26 is positioned to illuminate a temperature sensing element 40 on the card, and the indirectly reflected light is detected by the light detector 28. The output from the light detector 28 is transmitted to an analog-to-digital converter 42 which converts the signal, synchronized with the rotation of the card on the centrifuge, to a digital signal which is processed by central processing unit 44 and a comparitor 46. While the details of the analog-to-digital converter 42, the central processing unit 44 and the comparitor 46 form no part of the present invention, the digitized signal is compared in the comparitor with a signal representing a predetermined or threshold temperature which is programmed at the operator's discretion in the comparitor 46. If the reflectivity of the temperature sensing element 40 indicates that the temperature of the card on which the temperature sensing element is mounted is below the threshold temperature, then the comparitor 46 generates a signal actuating a trigger 48 which in turn controls a power supply 50 to energize the strobe 20. If, on the other hand, the temperature of the card as indicated by the temperature sensing element 40 is at a temperature higher than the threshold temperature, then no signal is generated, and hence the strobe is not actuated during that revolution of the card.

As will be appreciated by those skilled in the art, the illumination of the temperature sensing element 40 on the card by the light source 26 is synchronized with the spin rate of the plate so that each of a number of cards present on the rotating centrifuge can be individually examined by the light source 26 and the light detector 28 to determine their respective temperatures. By the same token, the central processing unit can be programmed to monitor the rotational speed of the centrifuge so that a given card, when the temperature thereof is below the threshold temperature set in the comparitor, is illuminated as it passes adjacent the strobe 20 after its temperature has been sensed by the detector 28. For example, if the detector 28 is positioned 75° of rotation before the position of the strobe light, the central processing unit will, after detecting a temperature below the threshold temperature, delay energizing the strobe for 75° of rotation so that the strobe is energized when that card bears the closest proximity to the strobe 20.

The strobe itself, shown schematically in FIG. 6 of the drawings, is preferably a xenon strobe light 52 which is surrounded by an ultraviolet absorbing coating 54 to absorb most of the ultraviolet radiation given off by the xenon light. Many of the chemical reactants employed in determining blood chemistries decompose in the presence of ultraviolet radiation, and hence the coating on the light is an effective measure to minimize such degradation.

In accordance with one preferred embodiment of the invention, it is sometimes desirable to employ a sample processor card which contains a coating on the face opposite the xenon strobe to maximize absorption of the radiant energy given off by the strobe light. One effective system for accomplishing that result is illustrated in FIG. 7 of the drawing. In that preferred embodiment, the card 24 itself is provided with a layer of adhesive 56 to secure to one face of the card a paper label 58. The adhesive is preferably formed of a light-absorbing material, and is preferably black in color to maximize the heat energy absorbed by the card to provide more efficient heating by the strobe light.

It will be understood that various changes and modifications can be made in the details of construction, procedure and use, without departing from the spirit of the invention, especially as defined in the following claims.

I claim:

1. In a sample processor card for carrying out chemical tests under centrifugal force in the form of a substantially closed card having a plurality of chambers therein for measuring sample and reagent, inlet means for supplying a sample to the card and a cuvette chamber in which a reaction between sample and reagent can be measured, the improvement comprising a temperature sensing element affixed to the card in close proximity to the cuvette chamber to detect and indicate the temperature of the cuvette chamber as a function of reflected light.

2. A card as defined in claim 1 wherein the temperature sensing means is a liquid crystal.

3. A card as defined in claim 1 wherein the temperature sensing means is mounted on a wall of the cuvette chamber means.

* * * * *